United States Patent Office 2,942,013
Patented June 21, 1960

2,942,013

HALOGENATED ARYL MONO-ETHERS OF 9,10-DIHYDROXYSTEARIC ACID AND SALTS THEREOF

Herman A. Bruson, North Haven, and Jack Rockett, New Haven, Conn., assignors to Olin Mathieson Chemical Corporation, New Haven, Conn., a corporation of Virginia No Drawing. Filed June 10, 1955, Ser. No. 514,689

4 Claims. (Cl. 260—408)

This invention relates to organic compounds and their production, and has for its object the provision of halogenated aryl mono-ethers of 9,10-dihydroxystearic acid and salts thereof, and a process of producing the compounds.

The process of the invention comprises reacting halogenated phenols in the presence of an alkaline catalyst with a salt of 9,10-epoxystearic acid to form a salt of halogenated mono-aryl ether of 9,10-dihydroxystearic acid. The process includes acidification of the salts thus formed to form the carboxylic acids and the subsequent conversion thereof to salts.

The process of the invention yields a mixture of two isomers which are hydroxy compounds according to the equation:

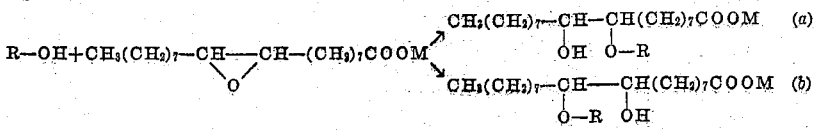

wherein R is a halogenated aryl radical and M is a metal. Upon acidification, a mixture of the two carboxylic acids corresponding to (a) and (b) above is obtained, M being replaced by hydrogen.

The new compounds in accordance with this invention may accordingly be defined as 9,10 disubstituted stearic acids, one substituent being hydroxyl and the other substituent being a halogenated aryloxy; and include salts of such disubstituted stearic acids. The compounds may be represented by the formula:

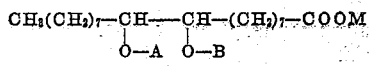

wherein A represents hydrogen or a halogenated aryl, B is hydrogen when A is a halogenated aryl and a halogenated aryl when A is hydrogen, and M is a monovalent radical chosen from the group consisting of hydrogen, a metal, ammonium and substituted ammonium radicals, and the saturated organic radical of an alcohol.

Among the halogenated phenols which can be used in the process of the invention for forming the new compounds are the mono-, di-, tri-, tetra- and pentachlorophenols, as well as the corresponding fluoro-, bromo-, or iodophenols. The phenols used can contain other nuclear substituents besides halogen such as, for example, alkyl, aryl, aralkyl, cycloalkyl, alkoxy and aryloxy groups.

The reaction is preferably carried out in the presence of an alkaline catalyst such as the alkali metals, their oxides, alcoholates, hydrides, amides and hydroxides which are efficient for the purpose, notably sodium and sodium hydroxide. When the phenol is strongly acidic as in the case of tetra- and pentachlorophenol, it is not necessary to use excess alkali, if an alkali metal salt is 9,10-epoxystearic acid is employed.

The products in the form of their salts or as the free acids are outstandingly useful as agricultural poisons, in particular as herbicides. In the form of their water soluble salts, they are effective germicidal soaps and emulsifying agents. Their polyvalent metal soaps (lead, zinc, barium, aluminum, calcium, etc.) are useful as additives for lubricating oils for improving lubricity. The copper and mercury salts are useful fungicides and bactericides.

The following examples illustrate processes carried out in accordance with the invention.

*Example 1*

A mixture of dry sodium 9,10-epoxystearate (80.1 g.) and pentachlorophenol (66.6 g.) in 350 cc. of dry toluene was stirred and boiled under reflux for five hours. The toluene was then distilled off at reduced pressure (250 mm. mercury). The two phase system became homogeneous during this distillation. Water (500 cc.) and concentrated hydrochloric acid (22 cc.) was then added and the reaction mixture was subjected to steam distillation to remove small amounts of excess pentachlorophenol. The residual oil was separated, taken up in ether and washed to pH 6.0. The ether was then removed by evaporation. The product was a viscous clear brown oil weighing 132.8 g., the analysis and properties of which correspond to a material consisting essentially of

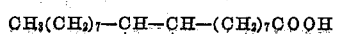
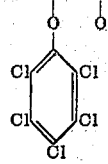

and

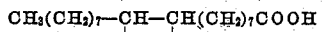
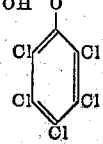

*Example 2*

A mixture of sodium (1.2 g.), para-chlorophenol (32.1 g.) and 150 cc. of toluene was stirred and heated under reflux until all the sodium had dissolved. Then 92.3 g. of dry sodium 9,10-epoxystearate was added with 200 cc. of additional toluene.

The mixture was stirred and boiled under reflux for 4 hours, after which the toluene was distilled off under reduced pressure. Water plus 45 cc. of concentrated hydrochloric acid was added and the mixture was steam distilled. When no more chlorophenol came over, the residual oil was separated, taken up in ether, washed, dried, filtered and evaporated to dryness.

The residual product was a clear yellow oil weighing 113.4 g. containing 7.5% chlorine by analysis corresponding to a material consisting essentially of:

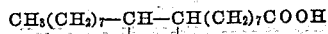

and

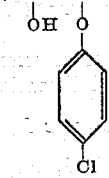

Examples 3 and 4

In the same manner as in Example 2, 2,4-dichlorophenol and 2,4,5-trichlorophenol react with sodium 9,10-epoxystearate to yield respectively 2,4-dichlorophenoxy-hydroxystearic acid and 2,4,5-trichlorophenoxy-hydroxystearic acid as pale yellow thick oils.

Example 5

A mixture of 38.1 g. of para-bromophenol, 150 cc. of toluene and 0.9 g. of sodium was stirred and boiled under reflux until all the sodium had dissolved. The solution became deep red. Then 74 g. of dry sodium 9,10-epoxystearate was added and 200 cc. more of toluene.

The mixture was stirred and boiled 4 hours under reflux after which the toluene was distilled off under reduced pressure. Water plus 35 cc. of concentrated hydrochloric acid was added and the mixture was steam distilled till no more bromophenol came over. The residual oil was taken up in ether, washed, dried, filtered and evaporated to dryness. An almost quantitative yield of a clear amber-colored oil was obtained, the bromine analysis of which corresponded to a material consisting essentially of

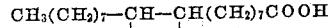
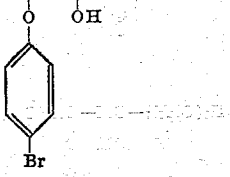

and

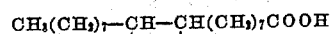
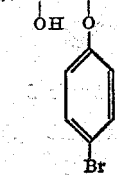

The sodium 9,10-epoxystearate used in the above specific examples was a commercial product containing 86.7% of the epoxystearate, the balance consisting mainly of stearate and some dihydroxystearate having no adverse effect on the syntheses. The starting material may be of higher or lower purity, the reacting proportions being in each case selected in accordance with the content of active reagent.

The halogenated aryl mono-ethers of 9,10-dihydroxystearic acid produced in accordance with the above specific examples are viscous pale yellow oils having a density greater than that of water.

In accordance with the above process, p-iodophenol and p-fluorophenol react with sodium 9,10-epoxystearate to yield, respectively, p-iodophenoxy-hydroxystearic acid and p-fluorophenoxy-hydroxystearic acid as pale yellow thick oils.

When the product is desired in the form of an alkali metal salt, it may be recovered as such from the reaction mixture or by neutralizing the free acid with the alkali metal oxide or hydroxide. Other salts, as of the alkaline earth metals and other polyvalent metals may be prepared by double decomposition reactions between an alkali metal (particularly lithium, sodium or potassium) salt of the halogenated aryl mono-ether of 9,10-dihydroxylstearic acid and a soluble salt of the other metal. In many cases, the polyvalent metal salts can also be made by neutralizing the free acid with the metal oxide or hydroxide.

The halogenated aryl mono-ethers of 9,10-dihydroxystearic acid and salts thereof, as described above, possess herbicidal properties and are advantageously applicable for use as weed killers. The water-soluble salts, particularly the sodium, potassium, ammonium and substituted ammonium salts are useful as germicidal soaps and emulsifying agents. The polyvalent metal salts, such as those of calcium, lead, zinc, barium and aluminum, may be added to lubricating oils and greases for enhancing the lubricity and other desirable properties. The copper and mercury salts are effective fungicides and bactericides.

We claim:

1. A compound of the group consisting of a halogenated-aryl mono-ether of 9,10-dihydroxystearic acid and inorganic salts thereof.
2. Pentachlorophenyl mono-ether of 9,10-dihydroxystearic acid.
3. Para-chlorophenyl mono-ether of 9,10-dihydroxystearic acid.
4. Para-bromophenyl mono-ether of 9,10-dihydroxystearic acid.

References Cited in the file of this patent

UNITED STATES PATENTS 2,542,062    Swern _____ Feb. 20, 1951